United States Patent
Watson et al.

(10) Patent No.: US 6,177,107 B1
(45) Date of Patent: Jan. 23, 2001

(54) BIOTIN AND B VITAMINS CONTAINING PET FOOD

(75) Inventors: Timothy David George Watson, Renfrewshire; Katrina Anne Marsh, Waltham-on-the-Wolds, both of (GB)

(73) Assignee: Mars UK Limited, Slough (GB)

(*) Notice: Under 35 U.S.C. 154(b), the term of this patent shall be extended for 0 days.

(21) Appl. No.: 09/160,403

(22) Filed: Sep. 25, 1998

(30) Foreign Application Priority Data

Mar. 25, 1998 (GB) .................................................. 9806444

(51) Int. Cl.[7] .......................... A61K 33/32; A61K 31/44; A61K 31/415; A61K 31/20
(52) U.S. Cl. .......................... 424/643; 514/345; 514/351; 514/392; 514/560
(58) Field of Search ..................... 514/392, 560, 514/345, 351; 424/643

(56) References Cited

U.S. PATENT DOCUMENTS

| | | | |
|---|---|---|---|
| 4,189,586 | * 2/1980 | Baggiolini et al. .................. | 548/303 |
| 4,237,118 | * 12/1980 | Howard ................................ | 424/140 |
| 5,017,389 | * 5/1991 | Green .................................. | 426/72 |
| 5,066,498 | * 11/1991 | McCauley, III ..................... | 426/2 |
| 5,069,903 | * 12/1991 | Stitt .................................... | 424/195.1 |
| 5,571,441 | * 11/1996 | Andon et al. ....................... | 252/1 |
| 5,789,401 | * 8/1998 | McCarty ............................. | 514/188 |
| 5,965,153 | * 10/1999 | Allen .................................. | 424/442 |

FOREIGN PATENT DOCUMENTS

| | | | |
|---|---|---|---|
| 3221286 | * 12/1983 | (DE) | ............................ 1/18 |
| 0609056 | * 1/1994 | (EP) | ............................ 1/16 |
| 0824152 | * 8/1997 | (EP) | ............................ 19/42 |

OTHER PUBLICATIONS

Fromageot. D., Interet potential de la biotine en dermatologie canine; Rec. Med Vet.; 1990, 166, (2), 87–94.*
Frigg, M. et al.; Clinical Study on the Effects of Biotin on Skin Conditions in Dogs; Schweiz. Arch. Tierheilk. 131, 621–625, 1989.*
Fromageot, D., et al.; Influence de L'Alimentation du Chien Sur sa Peau et Son Pelage; Rec. Med. Vet., 1982, 158, (12), 821–826.*
Messaritakis, J. et al.; Generalized seborrhoeic dermatitis: Clinical and therapeutic data of 25 patients; Archives of Disease in Childhood, 1975, 50, 871.*

* cited by examiner

*Primary Examiner*—Raymond Henley, III
(74) *Attorney, Agent, or Firm*—Fulbright & Jaworski L.L.P.

(57) ABSTRACT

The present invention is directed to a foodstuff or a dietary supplement that includes biotin at a concentration of at least 0.2 mg/400 kcal and one or more B vitamins at a total concentration of biotin plus B vitamins of at least 33.2 mg/400 kcal. The present invention is also directed to the method of using and preparing the foodstuff or dietary supplement.

25 Claims, 4 Drawing Sheets

BIOTIN AND B VITAMINS CONTAINING PET FOOD

TECHNICAL FIELD

This invention relates to a non-human diet or foodstuff which enhances or improves the coat and skin condition of a non-human animal. The invention also relates to methods for enhancing or improving the coat and skin condition of an animal and a process for producing the diet or foodstuff.

BACKGROUND ART

In most household pets, a healthy skin and coat indicates an animal in general good health. Since skin and coat problems are common in household pets, much research has gone into providing diets which repair deteriorations in skin and coat conditions, thus providing a basic level of healthy skin and coat.

Levels of nutrients in animal foods are well documented as to the provision of a complete and balanced food for healthy animals. Variations on individual ingredients in pet foods arc usually kept within well defined limits. Variations outside of these limits, in pets, is usually confined to the treatment of ill/diseased animals which show clinical symptoms.

Biotin (a B vitamin, also known as vitamin H) serves as a cofactor for enzymes critical in metabolism. A deficiency of biotin can lead to impaired synthesis and metabolism of long chain fatty acids which are important in cutaneous integrity. Biotin supplementation has been shown to be useful in the treatment of certain clinical skin conditions in dogs (Frigg, M., Schulze, J. and Volker, L., Schewiz. Arch. Tier helik. 131, 621–625, 1989). Deficiency in a number of other B vitamins manifests as dry scaly skin and a dry, brittle hair coat. Administration intravenously of biotin alone and biotin in combination with B vitamins, in humans, has been shown useful in the treatment of generalized seborrhoeic dermatitis in infants (Messaritakis, J., Kattamis, C., Karabula, C., and Matsaniotis, N., Archives of Disease in Childhood, 1975, 50, 871–874).

As the skin and coat condition of a pet provides such an inportant visual impact (in particular to pet owners and/or to the public in general) it is, and has been, of considerable interest to be able to deliver visible enhancements on animals with already good (healthy) skin and coat condition. This has previously not been within the control of pet owners.

SUMMARY OF THE INVENTION

The present invention relates to a non-buman diet or a non-human foodstuff comprising biotin at a concentration of at least 0.2 mg/400 kcal and one or more other B vitamins at a concentration of at least 33.0 mg/400 kcal, to a dietary supplement which, in addition to other nutrient intake supplies biotin at a concentration of at least 0.2 mg/400 kcal and one or more B other vitamins at a total concentration of at least 33.0 mg/400 kcal. The present invention also relates to the use of a diet, a foodstuff or a supplement, according to the present invention for enhancing and/or improving the skin and coat condition of a non-human animal and to a process for the preparation of a diet, foodstuff or supplement according to the present invention.

It is an object of the present invention to provide a non-human diet or foodstuff which can be used to enhance and/or improve the skin and coat condition of a non-human animal.

A further object is to provide a method for enhancing and/or improving the skin and coat condition of an animal. Yet a further object is to provide a dietary supplement which can be used to enhance and/or improve the skin and coat condition of a non-human animal.

A further object is to provide a process for the preparation of the diet. Foodstuff or supplement of the present invention.

Another object of the inventors is the use of the diet, foodstuff or supplement for enhancing and/or improving the skin and coat condition of an animal.

BRIEF DESCRIPTION OF THE DRAWINGS

The present invention is described with reference to the drawings relating to the Example, of which.

DETAILED DESCRIPTION OF THE INVENTION

Accordingly, the present invention provides, according to a first aspect, a non-human diet (which also includes a non-human foodstuff) comprising biotin at a concentration of at least 0.2 mg/400 kcal and one or more other B vitamins to a total concentration of biotin plus other B vitamins of at least 33.2 mg/400 kcal. Throughout this text, references to concentrations per kcal are to kcal total metabolisable energy intake. A diet/foodstuff according to the first aspect has been shown to be effective in producing superior skin and coat condition in non-human animals. Supplementation of a food with a combination of higher than normal levels of biotin and one or more other B vitamin provides a) reduced skin scales (dander), b) increased coat softness, c) improvement in coat feel and d) reduced transepidermal water loss (that is, including improved skin barrier function).

The present invention relates, for all aspects, to any non-human animal, in particular those with hair on the surface of the skin. Animals which have hair on the surface of the skin in an amount to form a substantially "coat", e.g. dogs, cats, horses, rabbits, guinea pigs, hamsters and other such animals may be most favourably effected by the present invention.

The invention provides a dramatic improvement when the specified levels of biotin and one or more other B vitamin are used in combination.

The first aspect of the invention is preferably used in combination with a complete and balanced food, for example, as described in National Research Council, 1985, Nutritional Requirements for Dogs, National Academy Press, Washington D.C. or Association of American Feed Control Officials, Official Publication 1996 and such as the complete balanced diet shown in the Examples. A complete and balanced food may contain biotin and other B vitamins. The levels present are included in the stated levels according to the invention.

The first aspect of the invention applies preferentially to a non-human animal (preferably a pet food) diet or foodstuff which is a wet, semi-moist or dry composition (food). Most preferably the invention relates to a domestic pet animal diet or foodstuff, especially for a dog or a cat. Wet food usually describes food which is sold in tins or otherwise hermetically sealed packaging and has a moisture content of 70 to 90%. Dry food usually describes food which is of a similar composition, but with 5 to 15% moisture and therefore is presented as small biscuit-like kibbles. The preferred compositions of such foods on a metabolisable energy basis are 13–100 g/400 kcal protein, 5–40 g/400 kcal fat, 0–100 g/400 kcal carbohydrate and 2–15 g/400 kcal ash. The diet or foodstuff may comprise meat or meat-product or may be without meat or meat-product. Meat 'substitute' may be provided in addition or in substitution. It may comprise a gelatinised starch matrix. The diet or foodstuff can be made according to any method known in the art, such as in Waltham Book of Dog and Cat Nutrition, Ed. ATB Edney, Chapter by A. Rainbird, entitled "A Balanced Diet" in pages 57 to 74, Pergamon Press Oxford. The concentrations of biotin and other B vitamins to be added to the diet/foodstuff are calculated on the basis of the energy content of the diet/foodstuff and of any additional nutrients which may be consumed by the animal. Preferred diet/feedstuff for horses is in the form of feed stock which may comprise barely, oats and wheat in the form of mash or other composition.

A complete diet or foodstuff, especially a complete pet food is a diet which meets all the nutritional requirements of the individual animal's lifestyle and life-stage.

The biotin and one or more other B vitamin may be added to the diet or foodstuff together or separately. They may be added at any time during the manufacture/processing of the diet/foodstuff, including at the end, as the last step before packaging.

A B vitamin is any one of a group of water-soluble vitamins that, although not chemically related, one open found together, the same kind of food and all function as coenzymes. The B vitamins according to the present invention are not limiting. Any recognised source of the vitamin, including a provitamin or a substance with a similar effect (See, e.g., The Feeding Stuffs Regulations 1995, No 1412, Her Majesty's Stationery Office) is included. This relates to all B vitamins, including biotin.

Preferred B vitamins according to the invention include:

For biotin; biotin itself, d-biotin, biotin dextran or a combination of two or more thereof. For other B vitamins; B1, thiamine, aneurin, thiamine pyrophosphate, thiamine hydrochloride, thiamine monophosphate chloride; B2, riboflavin; B3, niacin, nicatinic acid, nicotinamide; B5, D-pantothenic acid, pathothenol; B6, pyridoxine hydrochloride, pyridoxol, pyridoxal phosphate; B12, cyanocobalamin, 5-deoxyadenosyl cobalamin, or a combination of two or more thereof.

Preferred B vitamins for inclusion with biotin, according to the invention are; one or more of riboflavin, niacin, pantothenic acid and pyridoxine.

According to the present invention, the combined total of B vitamins other than biotin is at least 33 mg/400 kcal. This can comprise one or more different B vitamins. Preferably these include riboflavin, niacin, pantothenic acid and pyridoxine. Preferred separate lower limits of riboflavin, niacin, pantothenic acid and pyridoxine are as follows:

Riboflavin: 4 mg/400 kcal
Niacin: 20 mg/400 kcal
Pantothenic acid: 6 mg/400 kcal
Pyridoxine: 3 mg/400 kcal A particularly preferred embodiment of the invention is a diet or foodstuff with the lower limits of 0.2 mg/400 kcal biotin, 4 mg/400 kcal riboflavin, 20 mg/400 kcal niacin, 6 mg/400 kcal pantothenic acid and 3 mg/400 kcal pyridoxine, in combination.

Further preferred features of the invention are when one or more of the B vitamins concentrations are raised, optionally (and preferably) in combination with an elevated concentration of biotin.

Preferred raised concentrations are as follows:
Biotin: 0.25 mg/400 kcal or above, more preferably 1 mg/400 kcal or above
Riboflavin: 5 mg/400 kcal or above, more preferably 5.9 mg/400 kcal or above
Niacin: 25 mg/400 kcal or above more preferably 119 mg/400 kcal or above
Pantothenic acid: 7.5 mg/400 kcal or above, more preferably 15.4 mg/400 kcal or above
Pyridoxine: 3.75 mg/400 kcal or above, more preferably 5.8 mg/400 kcal or above Preferably, the upper biotin level is less than 3.4 mg/400 kcal in combination with a preferred upper total other B vitamin concentration of 364 mg/400 kcal. Preferred upper concentrations of particular B vitamins are:

Riboflavin: 27 mg/400 kcal
Niacin: 270 mg/400 kcal
Pantothenic acid: 40 mg/400 kcal
Pyridoxine: 27 mg/400 kcal A preferred concentration of all B vitamins, except biotin is at least 41.25 mg/400 kcal, more preferably at least 146.1 mg/400 kcal.

All of these preferred concentrations can be used in any combination, i.e. any concentration of biotin can be used with any concentration of any B vitamin.

The source of biotin or any B vitamin for inclusion in the present invention is not limiting. Suitable sources of biotin and other B vitamins include; liver, fish, eggs, milk, cereal, beans, meat, potato, nuts and concentrated forms available such as from Aldrich.

Since biotin and B vitamins arc ubiquitous in food, it will usually be necessary to determine the concentration of each which is present in the ingredients of the diet/foodstuff and then add sufficient quantities to bring the total concentration of each up to the required levels, according to the invention.

In addition to the levels of B vitamins and biotin stated according to the present invention, other particular ingredients can be included. Such particular ingredients include zinc and/or linoleic acid. Zinc may be included in the first aspect of the invention at a concentration of at least 5 mg/400 kcal, preferably at least 10 mg/400 kcal or 20 mg/400 kcal, more preferably above 28 mg/400 kcal, most preferably at least 40 mg/400 kcal. Linoleic acid may be included in the fast aspect of the invention at a concentration of at least 1.1 g/400 kcal, preferably at least 2.0 g/400 kcal, more preferably at least 4 g/400 kcal, most preferably at least 6 g/400 kcal. These levels of zinc and linoleic acid can be used in any combination (of zinc and linoleic acid) and with any combination of B vitamins and biotin according to the invention. A particularly useful concentration is zinc at above 28 mg/400 kcal and linoleic acid at 4 g/400 kcal or above: or zinc at a 20 mg/400 kcal and linoleic acid at 6 g/400 kcal or above.

Any additional ingredients, including zinc and linoleic acid may be added at any time during the manufacture/processing of the diet/foodstuff, including at the end, as the last step before packaging. The source of any ingredient, of the diet/foodstuff is not limiting. Preferred sources of zinc include zinc sulphate, zinc oxide, organic zinc complexes or a combination of two or more thereof. Preferred linoleic acid sources include safflower oil, sunflower oil, soybean oil, other plant or animal oils/fats or a combination of two or more thereof.

The addition of zinc and/or linoleic acid can be used to produce advantageous aspects of the invention.

Concentrations of Biotin, other B vitamins and other ingredients such as zinc and linolic acid according to the invention (that is, in units of mg or g/400 kcal) can easily be determined by those skilled in the art. In many cases, the energy density for a foodstuff is stated on the foodstuff label. Alternatively, energy densities are known for individual components of a foodstuff and can be used to determine the concentration of Biotin, other B vitamins, and optionally other ingredients.

The present invention provides a diet/foodstuff and dietary supplement which are suitable and appropriate for oral ingestion/consumption.

According to a second aspect of the invention there is provided a dietary supplement which, in addition to other nutrient intake, supplies a total biotin concentration of at least 0.2 mg/400 kcal and one or more other B vitamins to a total concentration of biotin plus other B vitamins of at least 33.2 mg/400 kcal. All features of the first aspect of the invention also apply to the second. This aspect of the invention is particularly useful to supplement a diet/foodstuff, which does not contain sufficiently high levels of biotin and B vitamin (according to the invention). The concentrations of biotin and B vitamins in the diet/foodstuff can easily be determined by typical or guaranteed analysis declared by the manufacturer either on the label or in supplementary material or by nutritional analysis of the diet and the required amount of supplement can be added to the animal's diet. This can be done by including a quantity of the supplement with the animal's diet or by additionally feeding a quantity of the supplement to the animal.

The supplement is preferably formed as a concentrate with extremely high levels of biotin/B vitamin which requires "dilution" before feeding to an animal. The supplement may be in any form, preferably non-liquid, such as a solid (e.g. a powder) or semi-solid (e.g. a food like consistency/gel). A liquid form can be mixed in with food or fed directly to the animal, for example via a spoon or via a pipette-like device.

The supplement can be high in both biotin and one or more B vitamin or can be a combined pack of at least two components, having the required concentration of biotin and B vitamin(s) separately.

The diet, foodstuff or supplement are preferably for use by animals which would benefit from the consumption thereof.

The present invention also provides, according to a third aspect; the use of a diet or foodstuff as set out for all features of the first aspect or, a dietary supplement as set out for all features of the second aspect in enhancing and/or improving the skin and coat condition of an animal. The use of the diet or foodstuff is effectively a process for enhancing and/or improving the skin and coat of the animal, the process comprising providing, for oral ingestion to a non-human animal a diet and/or a foodstuff according to the first aspect of the invention. All preferred features of the first and second aspects also apply to this process or use. The process and/or use can be considered to be applied to a non-human animal in need thereof when such an animal has been identified, while being healthy (in particular in relation to skin and coat condition), to be able to have an improved and/or enhanced skin and coat condition.

The invention is cosmetic in that it produces its effect in normal/healthy animals with good skin and coat condition, as well as those with non clinical dry scaly skin. The invention and its uses can thus be described as cosmetic and/or not therapy (non-therapeutic). The invention does not relate to the correction of real or marginal deficiencies, rather, it provides performance enhancement for healthy animals, preferably via a complete and balanced diet. It delivers visible enhancement on animals with already good skin and coat hair condition. The animal is preferably an individual which would benefit from the diet, foodstuff or supplement of this invention.

A fourth aspect of the invention provides a process for the preparation of any of the first or second aspects of the invention. The process comprises mixing together the ingredients (where appropriate), optionally heating to cook any raw food ingredients and presenting the mixture in a form suitable for consumption by or administration to an animal. All details and preferred features of the aspects one to three also apply to the fourth.

As previously discussed, the biotin and B vitamins (all or some of the required total) can be introduced into the mixture at any stage. Preferably the diet or foodstuff is a wet or dry product. Preferably, the supplement is a powder [or liquid] for easy admixing with a diet/foodstuff. Such admixing may be at the time of feeding to the animal.

The invention also provides, as a fifth aspect, a method for enhancing and/or improving the skin and coat condition of an animal, the method comprising supplying to the animal a diet, foodstuff or supplement according to the invention. All preferred features and details in respect of aspects one to four of the invention also apply to the fifth. The animal is preferably an individual which would benefit from the administration or consumption of the diet, foodstuff or supplement.

Improvements in skin and coat conditions according to the invention may also be associated with improved skin barrier function by the reduction of transepidermal water loss.

Improvements in skin and coat condition, according to the invention, may be determined by a quantitative descriptive analysis panel. This panel involves a specialist group of people to assess a number of characteristics of the animals being tested. This form of analysis is currently used in the cosmetics and health-care products in industry evaluation of and is described as follows:

The Quantitative Descriptive Analysis Panel

The following document identifies the methodology used to set up the Quantitative Descriptive Analysis (QDA) panel. It includes a description of the recruitment, training, validation and every day running of the panel.

1. The History

During 1994 and 1995, when the first skin and coat projects were getting underway, a panel of 15 associates were used to assess the condition of the cats' and dogs' coats in an attempt to provide a benchmark against how well products were feedings. The panel proved to be highly variable and lacked consistency. Some individuals showed biases, Data points were also frequently missing, due to individuals being unable to attend assessment sessions, as a result of prior engagements. Analysis of this poor quality data was difficult and never showed any statistical differences because of the noisy data.

A specialist panel of people was therefore required to assess the cats and dogs, and a consistent method of assessment needed to be adopted.

2. The Recruitment

It was essential to identify individuals who were interested in their task, and that were motivated to carry out a thorough assignment for the duration of the trial. For any animal assessments it is essential that potential recruits should:

i) be comfortable with handling animals, although they do not have to be animal owners themselves, ii) not suffer from any allergies which may affect their ability to carry out the assessments, iii) not suffer from abnormal colour vision—there are tests available to monitor for colour blindness and discrimination of colour, iv) have normal eyesight (with correction if necessary) and, if glasses are worn for close work, they should be worn for the assessments, v) be able to devote time to the assessments for the duration of the trial, vi) although not essential, it is useful if the group selected cover a broad age range; including both sexes can have advantages in forming a balanced group, vii) be identified as having good senses, viii) skills to observe for, during recruitment include teamwork, decision making and judgement, commitment and inter-personal effectiveness; these skills are essential if the panel are to succeed.

N.B. If the assessors are animal owners, then care should be taken to ensure, that if a trial animal has the same visual appearance (e.g. colour or breed), there is no bias in terms of favourable scoring.

3. Assessor Training

A small, well-trained panel is much better than a large untrained panel. For a dog study 20 potential candidates are selected, who demonstrated the necessary skills (listed above—section viii) at interview. These 20 people then began a training course, lasting approximately 12 hours over 3 days. During the first day the panel were introduced to the principles of assessment with 5 reference cats. The assessors were then asked to assess 8 cats, of differing colours and coat types, two of which were the same cat (we pretended they were sisters!).

This test monitors the consistency of individuals, looks at their ability to use the scale properly and can be used to compare their score against the panel mean to eliminate any biases. They were also asked to smell 3 dogs and rank them in order of offensiveness. This gave us an indication of how well the assessors handled the dogs and cats and an indication of their sensory skills. The best 10 assessors were selected to complete the next training session.

Day two involved assessing the same 8 cats, to see how repeatable the assessors were. They also completed a more complex odour recognition test and odour ranking test, to identify how sensitive their noses were! The best 5 assessors were then recruited onto the panel.

Day 3 involved more open discussions around the parameters to be assessed. This encouraged the group to get to know each other and learn to work together, as a team. Some time was also spent evaluating the Reference animals, a group of animals (preferably fed the same diet) which represent extremes of the scale in terms of coat condition.

These Reference animals are also assessed at the beginning of each assessment for half an hour. This provides the forum for a discussion to ensure they are all in agreement. A panel leader must run this discussion, to ensure that the quieter assessors give their views and do not just agree with the more dominant ones.

4. Presentation of Animals

The animal should be assessed in a random order, at each assessment stage, to eliminate any bias towards the first or last animals presented.

Between each assessment the assessors should wipe their hands with an alcohol tissue or wash them with soap and water.

Each animal should be examined by the assessors as a group but, to avoid any effect of change sin coat texture during handling, the assessors should touch each animal in the same sequence.

Each animal should only be identified by an unmemorable number, not by name. This prevents any subconscious favouritism and prevents recall of previous scores.

Each animal should be assessed under identical conditions, preferably indoors, to provide an even and consistently lit area.

Prior to evaluation, the coat should be combed evenly all over, in a standardised manner, to eliminate the influence of any disturbances in the way the coat is lying. A clean comb should be used for each animal. Combs should be de-greased in alcohol or methylated spirits.

5. Assessment Considerations

The sensory evaluation techniques rely upon a critical judgement made on each occasion. The assessors must understand that they are making an independent evaluation of an animal on a specific occasion. The assessors must be blind to all treatment groups that the animals may belong to. There is no harm however in giving some information about the trial e.g. something has been added to the diets of some of the animals to see if it has any effects on any aspects of the animals' coat condition. They may help to keep their interest levels high and make them feel they are doing a worthwhile job.

The scoring system to be used should comprise a numerical scale for each parameter under evaluation. The scale is a simple category scale with a minimum of 5 categories for the purpose of statistical analysis. The scale currently used by the QDA panel appears to be a line scale, but is in fact used as a category scale i.e. crosses are only marked on the whole and half numbers and not anywhere along the line.

6. Assessment Parameters

1. Gloss—this should be evaluated before touching the animal, so that the texture of the coat does not influence the assessor. The coat should be examined for the extent of light reflected from the coat. The darker coloured coats will naturally reflect more light tan the lighter coats, but the mixed coloured coats e.g. a brindle dog, tortoiseshell cat or roan horse can cause confusion and variability. These should be excluded from the trial if possible and ideally use one colour of animal only. If this is not possible, the panel should simply judge the gloss reflected from the different coloured areas and give an average score.

2. Softness—if possible the assessors should not just stroke the coats, but also get their fingers into the coat so that the true feel of the coat is detectable. In the case of horses this may not be possible if they are clipped, but in conjunction with an assessment of the softness of the mane and/or tail a better picture may be given. This highlights the importance of ensuring the grooming practises for each animal ids identical, and if one is clipped they should all be clipped.

3. Grease/Dryness—this parameter can be assessed at the same time as softness. Very often a greasy or dry feel are confused, hence the QDA panel now assess grease and dryness against an optimum feel.

4. Scale—the animal's body needs to be visually sectioned off into six areas. Assessments should be carried out, section by section, lifting the hairs in the opposite direction of growth, examining the skin and base of the hairs for signs of flaking. N.B. lighter coats may need very careful inspection. The scores, for each section, are then summed for the whole body and translated onto the scoring line. By dividing the body into six, the most accurately scored parameter has been created.

The invention will now be described with reference to the following non-limiting Example:

EXAMPLES

Summary

This trial evaluated levels of biotin and other B vitamins as nutritional drivers of superior skin and coat condition.

16 Labrador Retriever dogs were initially fed a complete balanced dry diet (see below) for nine weeks. Labradors were used as they are a breed with relatively constant coat colour thereby avoiding any differences in gloss which could be attributed to differences in coat colour. The following nine weeks they were divided into two groups that were offered either the complete balanced diet alone or supplemented with biotin in combination with other B vitamins according to the invention.

The parameters evaluated included the visual assessment of coat quality by trained assessors and trans-epidennal water loss.

No significant differences were detected in coat gloss of the dogs for different diets.

A significant reduction (p=0.005) in coat scale was observed in the group supplemented with biotin plus B vitamins according to the invention compared to the control group. The difference was clearly visible to dog owners.

Supplementation with biotin plus vitamins B produced according to the invention a significant increase in coat softness compared to the control group.

A significant difference (p<0.05) was observed between diets in the changes in option coat feel. Supplementation with biotin plus B vitamins according to the invention were associated with an improvement in optimum coat feel.

There was a significant decrease (p=0.05) in the transepidermal water loss of the dogs skin in the groups supplemented with biotin plus B vitamins (according to the invention).

These data clearly demonstrate that particular levels of biotin plus B vitamin intake are associated with significant and substantial improvements in skin and coat condition and skin barrier function.

The following shows the composition of Complete Balanced Diet according to the Examples:

| Ingredient | Inclusion |
|---|---|
| Rice | 24.9% |
| Whole corn | 18.8% |
| whole grain wheat | 12.2% |
| Chicken by-product meal | 18.7% |
| Corn gluten meal | 9.5% |
| Brewers yeast | 1.7% |
| Dried egg | 0.8% |
| Non-iodinised salt | 0.7% |
| Vitamin premix | 3.4% |
| Sunflower oil | 0.5% |

-continued

| Ingredient | Inclusion |
|---|---|
| Beef tallow | 4.9% |
| Poultry viscera | 4.4% |

Analytical profile - moisture 8.2%, protein 26.4%, fat 10.4%, ash 7.1%, fibre 2.2% (the remainder being made up of nitrogen-free extract (mainly carbohydrate)).

Methods

1. Trial Set-up a) Animals, Location and Feeding.

The trial was conducted utilising 16 black adult Labradors. The dogs were fed to maintain their bodyweight and therefore bodyweights were monitored weekly.

Amounts offered were adjusted to compensate for any excessive gain or loss of bodyweight.

b) Trial Design.

All dogs were offered the standard complete balanced diet so that all panels were standardised with respect to skin and coat condition. At the end of this preferred period the dogs were assessed on their coat condition and grouped into two equal panels with respect to coat gloss, coat scale, age and gender. Immediately following this prefeed each panel of dogs was fed with either the standard complete balanced diet the supplemented test diet, for an additional nine weeks, as outlined in Table 1.

TABLE 1

Trial Design

| Test Weeks | Period | Panel 1 | Panel 2 |
|---|---|---|---|
| 0–9 | Prefeed | Standard Diet | Standard Diet |
| 10–18 | Phase II | Standard Diet | Standard diet +Biotin +vits B | c) Foods

A single batch of the complete balanced diet was made up and used for the prefeed and phase II of the trial.

All supplements were added directly to the diet at the time of feeding in the form of powder mixed with 100 g of a complete balanced wet diet:

| Composition of a Complete Balanced Wet Diet | |
|---|---|
| Ingredient | Inclusion |
| Hashed beef tripe | 5.0% |
| Poultry blend | 14.3% |
| Udders | 2.3% |
| Manufactured chunks | 54.7% |
| Vitamin/minerals | 0.33% |
| Potassium salts | 1.67% |
| Gravy | 21.7% |

Analytical profile - 79% moisture, 6.5% protein, 5.0% fat, 2.2% ash (the remainder being made up of nitrogen free extract.

The final levels of all supplements offered to the dogs are shown in Table 2. The base levels of the ingredients are those indicated in the 'control' panel. Total (test) levels are base levels plus supplement and are shown in Panel 2.

TABLE 2

| | Levels Supplements presented daily. mg/400 kcal | |
| --- | --- | --- |
| | Panel 1 Control | Panel 2 Biotin + Vit B |
| Riboflavin | 0.54 | 5.9 |
| Pyridoxine | 0.53 | 5.8 |
| Pantothenic acid | 1.4 | 15.4 |
| Niacin | 10.78 | 118.8 |
| Biotin | 0.01 | 1.01 | d) Grooming.

As grooming has a major impact on coat condition, a regular pattern of grooming was followed throughout the trial. All dogs were uniformly groomed once weekly and bathed with shampoo three weeks before the end of the prefeed.

2. Parameters Measured a) Daily Intake

The energy requirement of each animal was calculated at the beginning of each feeding stage and the amount offered was adjusted accordingly. Individual food intakes were recorded daily for each dog. Individual weekly bodyweights were measured to monitor and correct any over or underfeeding.

b) Sensory Evaluation of Coat Condition.

The Quantitative Descriptive Analysis (QDA) panel was composed of five women who have been selected and trained, in house, to provide accurate and precise assessments of coat quality (for details refer to QDA described earlier).

Coat gloss was measured before any manual examination of the animal was carried out. Gloss was assessed by scoring the amount of light reflected from the coat.

Coat softness is a measure of the feel of the coat when the assessors run fingers through the full thickness of the coat.

Optimum coat feel is an absence of either a greasy or a dry feel of the coat (as often the two are indistinguishable on the basis of feel alone) and was measured at the same time as the softness. This parameter is subdivided into two measurements; along the top of the back and along the flanks, as there is variability between these areas.

Scale (dander) on the animals coat was an undesirable quality and is measured by visually assessing the amount of scale present in three different sections of the dogs' coat.

Each of the five parameters was assessed in each dog twice at the end of the prefeed (week 8 and week 9) and twice at the end of the test phase (week 17 and week 18).

c) Transepidermal Water Loss

Skin hydration was evaluated by measuring the conductivity of the skin using a dermal phase meter which yields a direct measure of the hydration of the stratum comes. Continuous measurements taken over a 30 second period provide an indirect measure of transepidermal water loss. Measurements were taken in duplicate at the end of the prefeed stage (weeks 8 and 9) and at the end of the test phase (weeks 17 and 18) from the inner surface of both left and right ears. These provide a direct assessment of skin barrier function.

3. Data Analysis and Presentation.

All results are presented as the change in parameters from the end of the prefeed (mean of weeks 8 and 9) to the end of the test phase (mean of weeks 17 and 18). Statistical differences between the changes observed in each panel were assessed by one-way analysis of variance (ANOVA). Statistical significance was reached when p is equal to or less than 0.05).

Results

Figure 2:
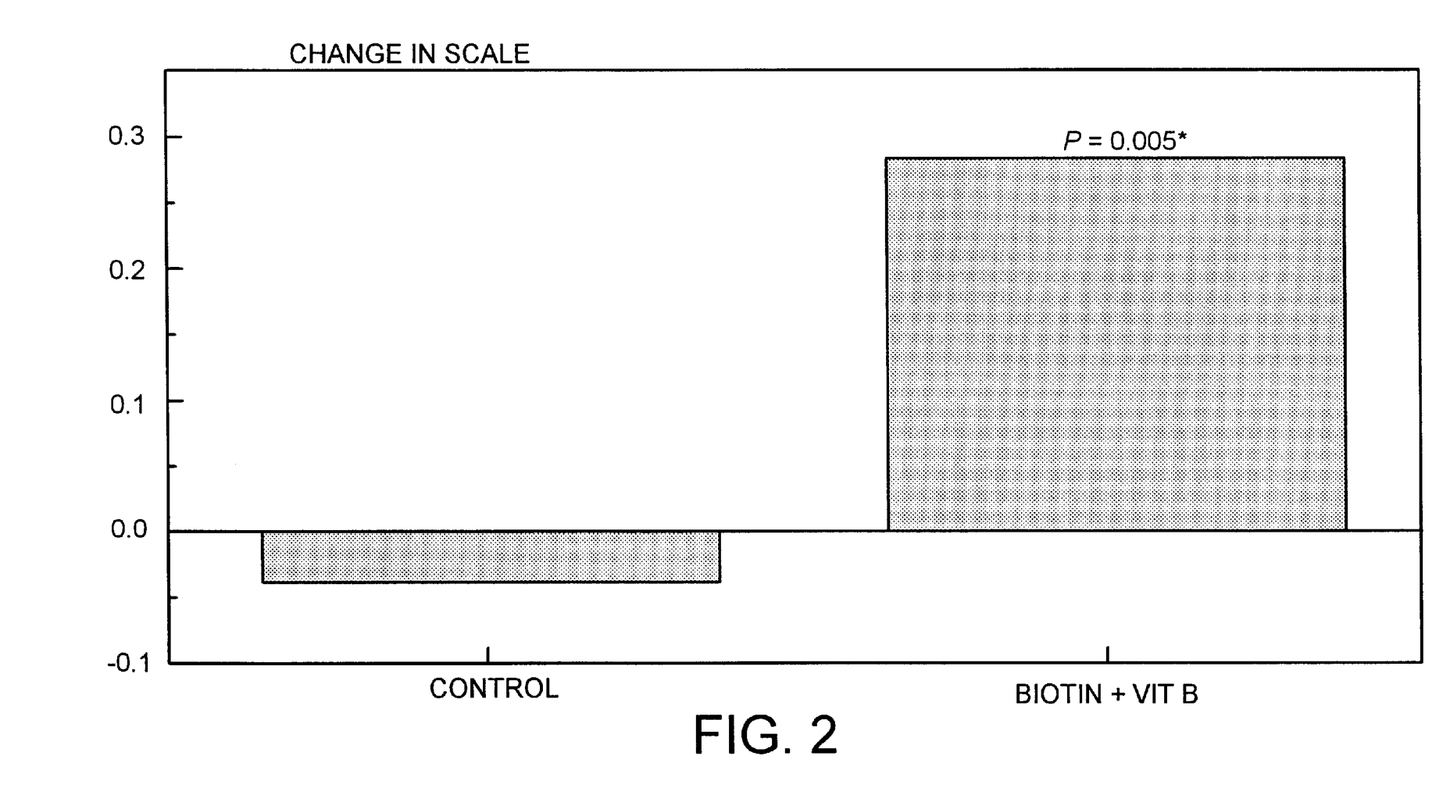
FIG. 2 is a graph showing improvements in coat scale.

A significant reduction (p=0.005) in coat scale was observed in the panel receiving biotin plus B vitamins (FIG. 2) when compared to the control panel.

Figure 1:
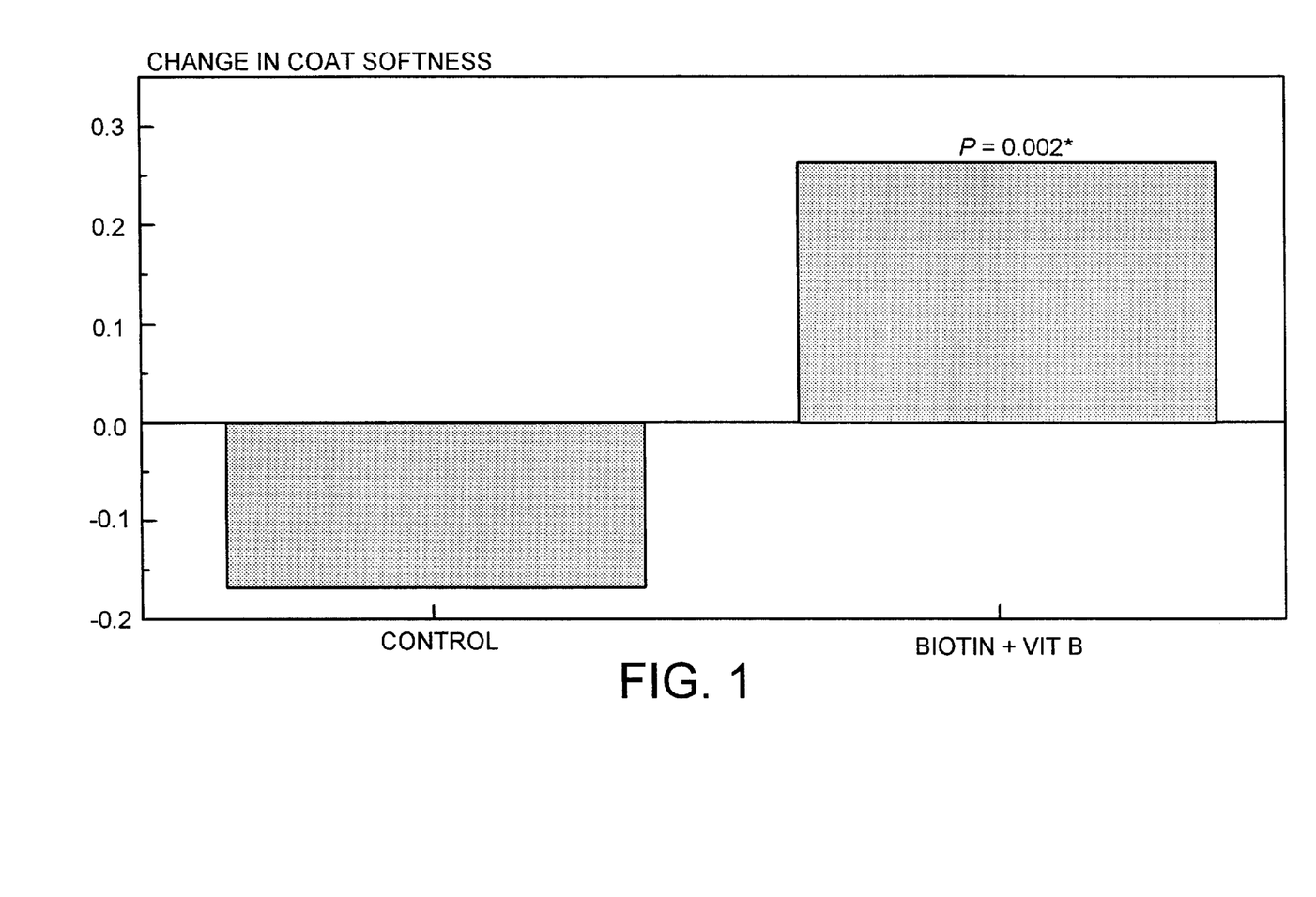
FIG. 1 is a graph showing changes in coat softness.

Supplementation biotin plus vitamins B produced a significant increase in coat softness compared to that in the control group (FIG. 1).

Figure 3:
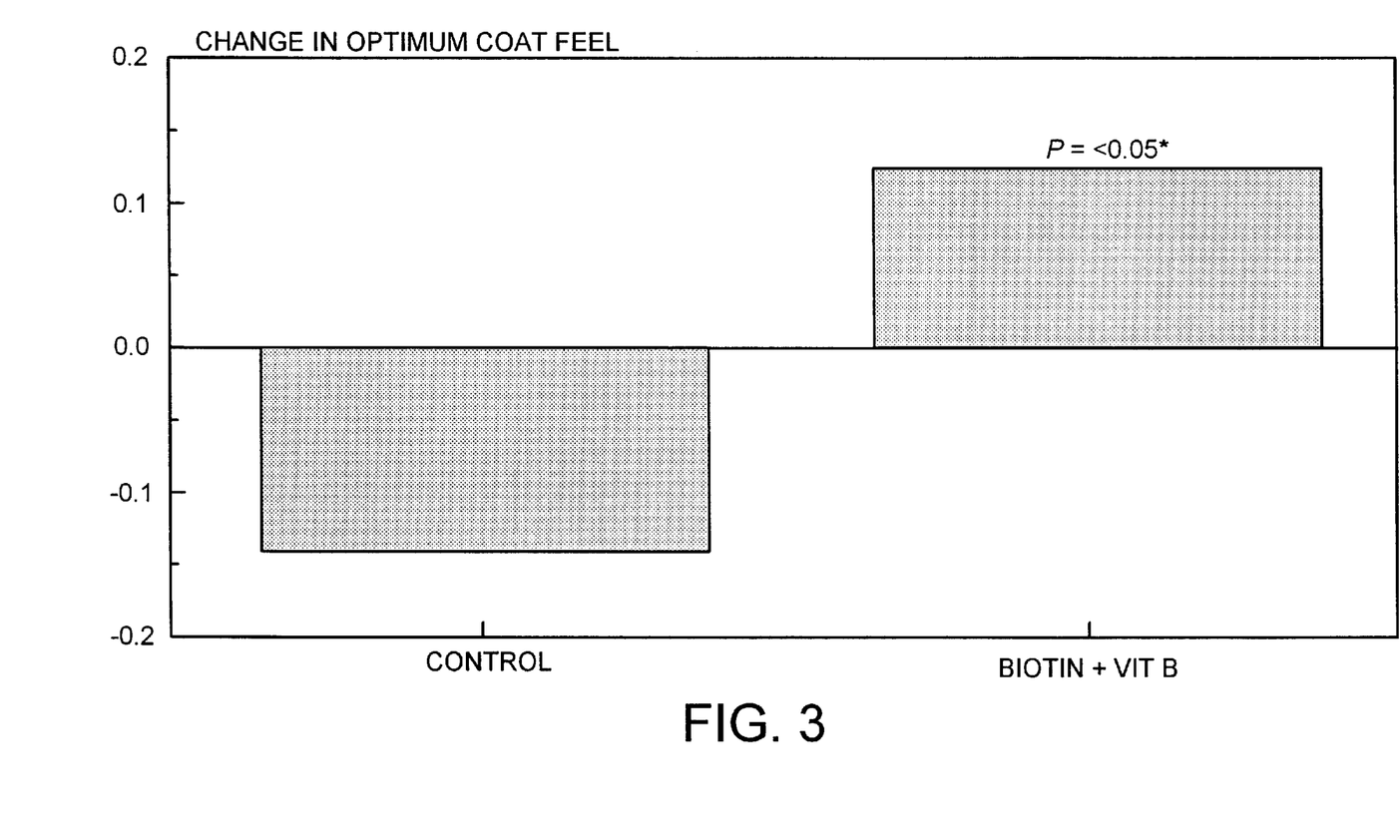
FIG. 3 is a graph showing change in coat feel.
Figure 4:
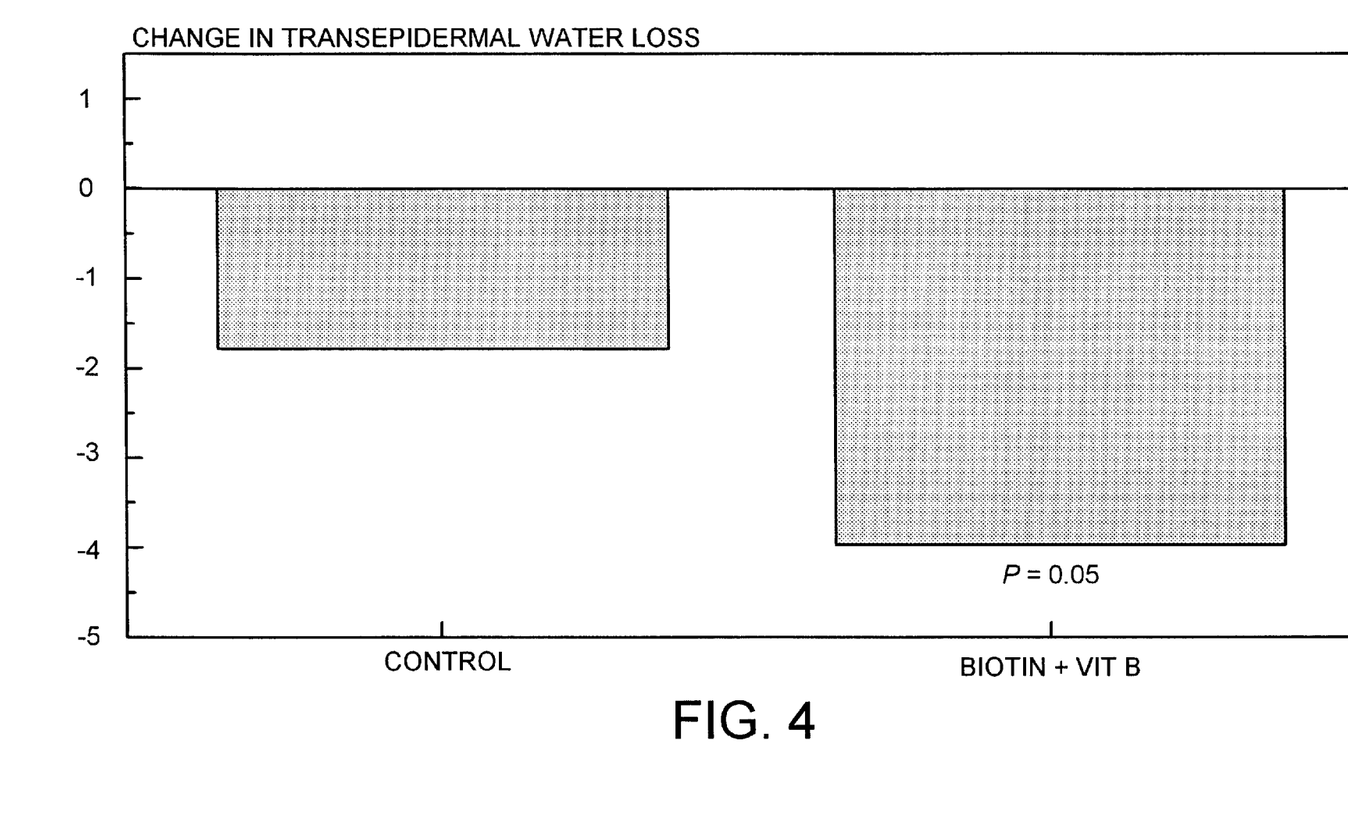
FIG. 4 is a graph showing the reduction in transepidermal water loss and improvements in skin barrier function.

A significant difference (p<0.05) was observed between diets in the changes in optimum coat feel over the duration of the test phase (FIG. 3). Supplementation with biotin plus B vitamins was associated with an improvement in optimum coat feel. During the test phase, dogs in the control group showed no significant change in transepidermal water loss (TEWL, FIG. 4). Supplementation with biotin plus B vitamins was associated with a large, significant (p=0.05) decrease in TEWL over the test period.

Discussion

A reduction in non-clinical scale or dander plays a major role in the achievement of a superior skin and coat condition in animals (cosmetic appearance).

Biotin plus B vitamins, in the levels specified, are ingredients which reduce scale or dander in healthy animals. Biotin plus B vitamins in the levels specified according to the invention significantly reduce transepidermal water loss thereby improving the barrier function and hydration of the skin. It is possible that this increase in hydration of the skin is linked with the reduced amount of scale on the animal's skin hair, via the action of these vitamins in promoting healthy skin growth. Supplementation of a diet with biotin plus B vitamins shows an improvement in coat softness.

Although the invention has been described in considerable detail through the preceding examples and in some of the remaining text, such detail is for the purpose of illustration. Many variations and modifications can be made by one skilled in the art without departing from the spirit and scope of the invention as described in the appended claims.

What is claimed is:

1. A foodstuff comprising biotin at a concentration of at least 0.2 mg/400 kcal and one or more B vitamins at a total concentration of biotin plus B vitamins of at least 33.2 mg/400 kcal.

2. A foodstuff, as claimed in claim 1 wherein biotin is at a concentration of at least 1 mg/400 kcal.

3. A foodstuff, as claimed in claim 1 wherein the B vitamins are a mixture of riboflavin, niacin, pantothenic acid and pyridoxine.

4. A foodstuff, as claimed in claim 1, wherein the foodstuff is formulated for feeding to a pet animal.

5. A foodstuff, as claimed in claim 1, wherein the foodstuff provides a complete and balanced diet.

6. A foodstuff, as claimed in claim 1, further comprising zinc at a concentration of at least 5 mg/400 kcal.

7. A foodstuff, as claimed claim 1, further comprising linoleic acid at a concentration of at least 1.1 g/400 kcal.

8. A diet or foodstuff, as claimed in claim 1 which is selected from the group consisting of a wet and dry composition.

9. A dietary supplement, which, in addition to other nutrient intake, supplies a total biotin intake of at least 0.2 mg/400 kcal and one or more B vitamins at a total concentration of biotin plus B vitamins of at least 33.2 mg/400 kcal.

10. A dietary supplement, as claimed in claim 9 which has biotin and one or more B vitamins at a total concentration of 147.1 mg/400 kcal.

11. A dietary supplement, as claimed in claim 9 wherein the B vitamins are a mixture of riboflavin, niacin, pantothenic acid and pyridoxine.

12. A dictate supplement, as claimed in claim 9, wherein the dietary supplement is formulated for feeding to a pet animal.

13. A dietary supplement, as claimed in claim 9, wherein the supplement, in addition to other nutrient intake provides a total minimum zinc intake of at least 5 mg/400 kcal.

14. A dietary supplement, as claimed in claim 9, wherein the supplement, in addition to other nutrient intake provides a total minimum linoleic acid intake of at least 1.1 g/400 kcal.

15. A dietary supplement, as claimed in claim 9, which is in powder form.

16. A process for the preparation of a foodstuff wherein the foodstuff comprises biotin at a concentration of at least 0.2 mg/400 kcal and one or more B vitamins at a total concentration of biotin plus B vitamins of at least 33.2 mg/400 kcal the process comprising, mixing together the ingredients, optionally heating to cook any raw food ingredients and presenting the mixture in a form suitable for consumption.

17. A process for the preparation of a dietary supplement, which, in addition to other nutrient intake, supplies a total biotin intake of at least 0.2 mg/400 kcal and one or more B vitamins at a total concentration of biotin plus B vitamins of at least 33.2 mg/400 kcal, the process comprising mixing together the ingredients, optionally heating to cook any raw ingredients and presenting the mixture in a form suitable for consumption.

18. A method for enhancing the skin and coat condition of an animal, the method comprising supplying, to an animal, a foodstuff comprising biotin at a concentration of at least 0.2 mg/400 kcal and one or more B vitamins at a total concentration of biotin plus B vitamins of at least 33.2 mg/400 kcal.

19. A method as claimed in claim 18 wherein the B vitamins are a mixture of riboflavin, niacin, pantothenic acid and pyridoxine.

20. A method as claimed in claim 18, wherein the animal is selected from a group consisting of cats and dogs.

21. A method for enhancing the skin and coat condition of all animal, the method comprising supplying to the animal a dietary supplement, which, in addition to other nutrient intake, supplies a total biotin intake of at least 0.2 mg/400 kcal and one or more B vitamins at a total concentration of biotin plus B vitamins of at least 33.2 mg/400 kcal.

22. A method as claimed in claim 21, wherein biotin is at a final concentration of at least 1 mg/400 kcal.

23. A method as claimed in claim 21, wherein the supplement is added to the animal food at the time of feeding.

24. The method as claimed in claim 18, wherein the animal is a pet animal.

25. The method as claimed in claim 21, wherein the animal is a pet animal.

* * * * *